Feb. 14, 1961

U. S. MITCHELL 2,971,718

DOUBLE-HUB TAPE REEL

Filed Oct. 5, 1959

INVENTOR.
ULYSS S. MITCHELL

BY

Lippincott & Ralls
ATTORNEYS 2,971,718

DOUBLE-HUB TAPE REEL

Ulyss S. Mitchell, 1150 Yew St., San Mateo, Calif.

Filed Oct. 5, 1959, Ser. No. 844,506

7 Claims. (Cl. 242—55.13)

The present invention relates to a reel for magnetic tape or the like and having a double-hub configuration with inclined friction wheels transmitting differential drive between hub portions thereof.

Various devices adapted for the reproduction of audio and video information or intelligence employ a tape medium, upon which there is impressed such information for the recording of same, whereby later playback operations serve to reproduce the original intelligence. Particularly in the field of magnetic tape recorders and playback equipment, for example, there are employed elongated magnetic tapes, upon which signals are transcribed for storing either visual or audible intelligence, so that same is available for later reproduction. In the art of magnetic tape recorders and playback equipment, considerable emphasis has been placed upon the reduction in overall size and complexity of apparatus. In this respect the handling of magnetic tape has received considerable attention, and there have been developed devices for reeling, storing, and unreeling magnetic tape, to the end of providing such tape in a compact form for storage and in a readily accessible form for initial recording and subsequent reproduction. A marked improvement in this field has been provided by devices employing an endless loop of magnetic tape wound upon a single reel so as to be available to be withdrawn from such reel and to be rewound thereupon in the same operation. It will be appreciated that this advancement removes the necessity of providing a pair of relatively large reels between which the magnetic tape is passed for reeling and unreeling same during operations thereon.

While the magnetic tape cartridge of the type employing an endless loop is, as noted above, accepted as a substantial advancement in the art of tape handling, certain serious difficulties have been encountered therewith. Careful consideration of the operations involved in the reeling and unreeling of magnetic tape simultaneously upon a single hub, indicates that a slippage of the tape with relation to adjacent loops thereof is necessarily required. High fidelity sound reproduction, for example, has proved to be materially affected by this slippage. A substantial noise level is introduced by this phenomenon. Of possibly greater importance is the static electricity, which has been found to be developed by the slippage of magnetic tape across adjacent loops of the same tape, whereby a binding of the tape occurs. Whatever the cause of such binding, it has been found in many instances that a smooth and uninterrupted passage of tape past a recording or playback head from an endless loop cartridge is not possible. Intermittent and continuing discontinuity in the rate of travel of the tape past the head is encountered, and this condition is wholly incompatible with high quality reproduction and playback apparatus. Despite these disadvantages of the endless loop magnetic tape cartridge, the evident advantages achieved by the vary substantial reduction in cartridge size has yet caused these types of cartridges to be very widely employed, and in this respect the present invention provides the advantages of compactness and simplicity without the above-noted and other disadvantages encountered with endless loop cartridges of the prior art.

The present invention provides for the simultaneous winding and unwinding of tape such as magnetic recording tape about a single reel. This is herein accomplished without any slippage between adjacent loops of magnetic tape, for in the present invention there is provided a double-hub reel wherein the rate of rotation of unwinding tape is not the same as the rate of rotation of winding tape. It is believed to be evident that a reel having a substantial number of turns of magnetic tape, or the like, wound thereabout will be rotated by the removal of tape therefrom at a circumferential rate which is necessarily equal to the circumferential velocity of a reel upon which tape is initially being wound. Under the circumstance wherein both reels have the same radius, the larger effective radius of the reel having a plurality of numbers of turns of tape thereon will thereby cause such reel to be rotated at a lesser angular velocity than the reel having only a few turns of tape thereon. It is thus necessary, in this foregoing example, for there to be provided a differential rotational motion of the two hubs, in order that tape may be fed at a uniform rate from one to the other. In actual practice, wherein a substantial length of magnetic tape is employed in a single cartridge, the relative rates of rotation of a pair of reels between which the tape is wound, may vary from the ratio of about 2½ to 1 in one direction through an equal ratio at a point wherein an equal amount of tape is disposed on each reel, to a ratio of about 2½ to 1 in the opposite direction. This relatively wide range will be seen to provide substantial problems as regards the slippage of tape on an endless loop single-reel cartridge, and similar problems in any other type of compacted tape cartridge. In those instances wherein a pair of like reels are provided, it is customary to employ separate differential drive means for each reel, in order to attain high fidelity reproduction and recording.

With a definite aim toward attaining high quality recording and reproduction, the present invention is yet directed toward the provision of the compactness and other advantages of single-reel cartridges for recording tapes. It is herein envisioned that magnetic tape shall be wound upon a single reel, with provision being made for the differential rotation of separate hubs of the reel to accommodate variations in the outer diameter thereof caused by unequal amounts of tape upon separate portions of the reel during the winding of the tape from one hub to another. Furthermore, the present invention provides for the traverse of tape from one hub to the other, and back again, with the required differential rotational relationship being maintained at all times during movement of the tape in either direction.

More specifically, the present invention provides a tape reel having a dual or double-hub arrangement, with these double hubs being alternately interconnected by differential drive means of marked simplicity, providing for the utmost in reliable operation and a minimization of expense in the manufacture thereof. This differential drive arrangement is herein provided by pairs of inclined drive wheels disposed in frictional engagement with the two hubs of the reel, there being provided two such pairs of wheels adapted to individually operate in separate directions of rotation of the two hubs of the reel. The reversible differential drive is fully contained within a single reel adapted to receive magnetic tape or the like wound thereupon. As above noted, the simplified structure of the present invention is of particular importance, for not only is the reliability and longevity of the reel hereof thereby maximized, but also the difficulty and expense of construction is minimized. This latter feature is of particular importance in the field of magnetic tape recording and playback devices, for example, inasmuch as magnetic tape reels are therein considered to be of an almost disposable nature. Low cost is thus a pre-requisite to widespread applicability of any type of magnetic tape reel.

It is an object of the present invention to provide an improved reel for magnetic tape and the like having the advantages of an endless loop reel without the attendant disadvantages thereof.

It is another object of the present invention to provide a magnetic tape cartridge having a single reel for the simultaneous winding and unwinding of tape thereon, without slippage between adjacent loops of tape upon the reel.

It is a further object of the present invention to provide means for simultaneously winding and unwinding of magnetic wire or tape by a single reel including a supply hub and take-up hub having a variable rotational relationship therebetween.

It is yet another object of the present invention to provide for compacting of reels for magnetic tape and the like, by the provision of a double-hub reel having a reversible differential rotational relationship between the separate hubs thereof.

Various other possible objects and advantages of the present invention will become apparent to those skilled in the art from the following description of a preferred embodiment of the present invention. No limitation is intended by the terms of the following description, but instead, reference is made to the appended claims for a precise delineation of the true scope of this invention.

The invention is illustrated in the accompanying drawings, wherein.

Figure 1:
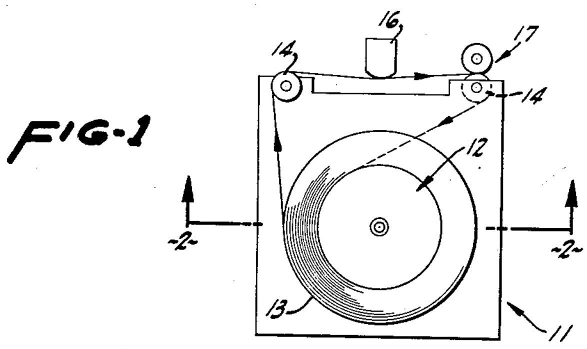
Fig. 1 is a plan view of a magnetic tape cartridge with the covering removed therefrom, and schematically illustrating a playback head, guide means, and drive means, which may be utilized in conjunction with magnetic tape wound upon the double-hub tape reel of the illustrated cartridge.

Considering now the details of a preferred embodiment of the present invention and referring first to Fig. 1 for the general lay-out and possible usage of the reel hereof, there will be seen to be provided a magnetic tape cartridge 11 including a reel 12 mounted for rotation thereon. The cartridge is illustrated without a cover to show magnetic tape or wire 13 wound about the reel, the term "tape" being herein employed to include wire and the like. This magnetic tape extends about guide members 14 and across a playback or recording head 16. The magnetic tape is drawn across the recording head 16 in the direction of the arrows upon the tape by means of a conventional capstan and pinch wheel arrangement 17, wherein the capstan is rotated by an electric motor or the like to frictionally draw the tape between same and the pinch wheel. The magnetic tape cartridge illustrated is adapted to accommodate reversible tape motion so that tape may be unreeled from one portion of the reel onto the other portion and subsequently returned. This is conventionally handled as to the tape drive mechanism by the provision of suitable means such as a second capstan and pinch wheel on the opposite side of the recording and/or playback head 16, so that the tape is at all times drawn across the head 16, whichever the direction of motion of the tape.

Figure 3:
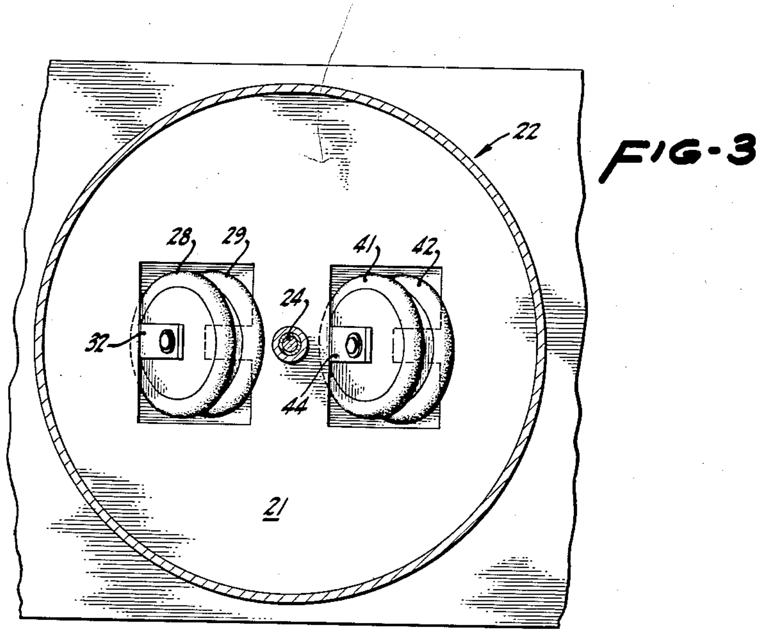
Fig. 3 is a plan view in section taken in the plane 3—3 of Fig. 2.
Figures 2, 4:
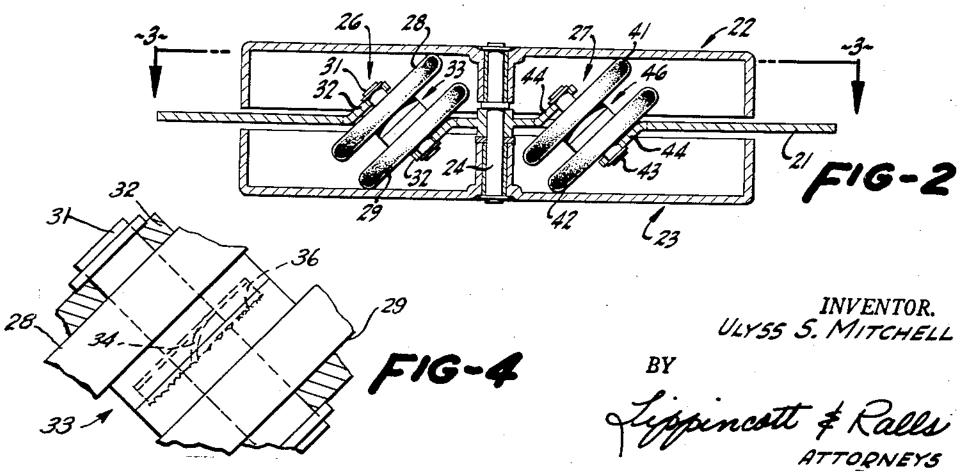
Fig. 2 is a sectional view through the double-hub tape reel of the present invention.
Fig. 4 is an enlarged fragmentary view of a portion of the drive means illustrating a suitable ratchet connection.

Considering now the structural details of the tape reel of the present invention, reference is made to Figs. 2 and 3 of the drawings. As therein illustrated, the reel will be seen to include a central stationary plate 21, upon which there are mounted a pair of opposed hubs 22 and 23 on opposite sides thereof. Each of these hubs is mounted for rotation upon the plate 21, and both of the hubs have rims or flanges about the periphery thereof, upon which magnetic tape is adapted to be wound and unwound. Rotational mounting of the hubs 22 and 23 upon the plate 21 may be accomplished in any convenient manner such as, for example, by the provision of a shaft 24 extending through the plate 21 and engaging the separate hubs in rotational relationship thereto, the hubs being secured to the shaft so as to be retained against movement longitudinally thereof. During the reeling or unreeling of magnetic tape onto or off of separate hubs of the reel, a differential rotation of the separate hubs is required in order to accommodate the uniform movement of the tape from one reel to another, wherein more tape is wound upon one of the hubs than the other. It is also required that the take-up portion of the reel be driven so as to maintain a steady tension upon the tape being wound thereon. The supply portion of the reel is rotated by pulling of the tape therefrom, as for example, by the pinch wheel and capstan noted above. However, it is necessary to provide for driving the take-up portion of the reel and such is herein accomplished in a differential manner from the supply hub. More specifically, there is herein provided first drive means 26, and second means 27. The first drive means 26 serves to rotate the upper hub 22 from the forced rotation of the lower hub 23, while the second drive means 27 serves the opposite function during reverse rotation of the reel to drive the lower hub 23 in response to forced rotation of the upper hub 22.

The drive means 26 is composed of a pair of friction wheels 28 and 29, mounted for rotation upon a shaft 31 which is, in turn, secured between a pair of lugs 32 formed by the bending of portions of the stationary plate 21. The drive wheels 28 and 29 are disposed in an opening provided in the stationary plate 21, afforded at least in part by the lug portions 32 thereof, and the shaft 31 is inclined so as to dispose the periphery of the upper wheel 28 in frictional engagement with the undersurface of the upper hub 22 and the periphery of the lower wheel 29 in engagement with the inner surface of the lower hub 23. The shaft 31 is inclined upwardly and outwardly of the hub axis defined by the shaft 24, so that the lower wheel 29 engages the lower hub 23 at a greater radius than the radius of the upper hub 22 engaged by the upper wheel 28. As noted above, the wheels 28 and 29 are mounted for rotation in frictional engagement with the hubs respectively contacted thereby, and provision is made for affording a driven relation in a single direction between the two wheels 28 and 29. This may be readily accomplished by the provision of a simple ratchet 33 interposed between the friction wheels 28 and 29.

Various types of ratchet connections may be employed and specific details thereof form no part of the present invention; however, one simple ratchet means 33 is shown in Fig. 4 as exemplary. A resilient prong 34, depending from a ring fixed in a depression in the wheel 28, extends into contact with a toothed surface 36 about a facing depression in the wheel 29. With the prong 34 on the far side of the shaft in the illustration, same will ride over the toothed surface 36 for counterclockwise rotation of the lower wheel, as viewed from above the reel, but will lock into the surface 36 for an opposite direction of rotation.

The ratchet connection 46 between frictional wheels 41, 42 is similar to that shown in Fig. 4 except the teeth and prongs embodied in the ratchet 46 would be oppositely oriented to effect a reversal of the tape take-up drive. It is contemplated that the upper hub 22 shall be frictionally driven by rotation of the lower hub 23 caused by the removal of tape therefrom. Withdrawing of tape from the lower hub 23 will cause same to rotate upon the shaft 24 and to thereby rotate the lower drive or frictional wheel 29 which frictionally engages the inner surface of this lower hub 23. In this direction of rotation the two friction wheels 28 and 29 are locked together so that frictional drive of the lower wheel 29 will be transmitted directly to the upper wheel 28, causing same to rotate. Rotation of the upper wheel 28 will thereby transmit rotational motion to the upper hub 22, because of the frictional engagement of this wheel and hub. It will be appreciated that the lower wheel 29 engages the lower hub 23 at a much greater radius upon the hub than the radius of the upper hub 22 engaged by the upper wheel 28. Consequently, a full rotation of the lower hub 23 will be seen to be transmitted to the upper hub 22 as a much greater rotation, preferably of the order of 2.5 full turns of the hub. This particular differential ratio is herein suggested because of the increased radius of one hub resulting from the winding thereupon of a magnetic tape of conventional length and thickness.

It will be appreciated that with the magnetic tape 13 wound about one of the hubs of the reel and extending into engagement with the other hub, a substantially greater rate of rotation of the hub containing almost no tape is required in order for the tape to move smoothly from one hub to the other. The differential rotational motion is herein provided by driving the take-up hub of the reel at a greater rotational speed than the supply hub of the reel through the drive means 26 and 27 hereof. A differential drive connection is afforded by the drive means 26, for example, wherein a ratio of 2.5 to 1 or some other desired ratio is provided between the driven rotational speed of the take-up hub as compared to the rotational speed of the supply hub of the reel. It of course follows that as tape is unwound from the supply hub of the reel and wound in increasing amounts upon the take-up portion thereof, a variation in the drive relationship is required in order to maintain a constant and desired tension upon the magnetic tape being reeled from one hub portion to the other of the reel. This is herein accomplished by the provision of a frictional drive engagement accommodating slippage between the wheels 28 and 29 of the drive means 26, and the inner surfaces of the hubs 22 and 23 of the reel.

The drive means 27 is circumferentially displaced about the hubs from the drive means 26, for example, in direct diametric opposition to the drive means 26. These second drive means 27 are substantially the same as that described above, and include a pair of friction wheels 41 and 42 mounted for rotation upon a shaft 43, which is, in turn, fixed between a pair of lugs 44 secured to the central plate 21. The shaft 43 of the second drive means 27 is inclined in the same direction as the shaft 31 of the first drive means 26, so that the upper friction wheel 41 engages the upper hub 22 at a greater radius of same than the radius upon the lower hub 23 engaged by the lower drive wheel 42. This will be seen to be in direct opposition to the orientation of the first drive means 26, inasmuch as the second drive means is illustrated as being disposed in diametric opposition to the first drive means. In the instance wherein these drive means are otherwise oriented circumferentially of the hubs, it will be appreciated that an alternative disposition of the shaft thereof is required. The two friction wheels 41 and 42 of the second drive means 27 are interconnected by ratchet means 46 affording a direct drive connection from the upper wheel 41 to the lower wheel 42, and substantially no interconnection between these wheels in the opposite direction of rotation.

Considering further the operation of the double-hub magnetic tape reel of the present invention described above, it will be noted that for the orientation of tape drive means 17, and playback or reproduction heads 16 in relation to the illustrated cartridge of Fig. 1, the lower hub 23 is adapted to be rotated in a clockwise direction when acting as a supply hub of the reel. This direction of rotation of the lower hub 23 by withdrawing tape 13 therefrom will cause the lower wheel 29 of the first drive means 26 to be rotated in a clockwise direction, as viewed in Figs. 1 and 3. The ratchet 33 of the drive means 26 is arranged to lock together the two wheels 28 and 29 for this direction of motion, so that the upper wheel 28 is thus also rotated in a clockwise direction, as viewed from the top. Such a direction of rotation of the upper wheel of the first drive means 26 will be seen to frictionally drive the upper hub 22 in a counterclockwise direction, as is required to reel tape thereon in the arrangement illustrated in Fig. 1. At the initiation of unreeling from the lower hub 23, a drive ratio of approximately 2.5 may be provided between the lower hub and upper hub of the reel, so that the upper hub will thus rotate at approximately 2.5 times as fast as the lower hub to maintain a desired constant tension upon the tape 13 being wound upon the upper hub. As more and more tape is unreeled from the lower hub 23, it will be apparent that the radius at which the tape is leaving the hub decreases, and, likewise, the radius at which the tape is fed upon the upper hub increases as more tape is wound thereon. The present invention accommodates the required differential drive ratio between the hubs of the reel by the provision of frictional engagement of the drive means wheels 28 and 29 with the inner surfaces of the hubs 22 and 23. Thus, a slippage occurs at the frictional engagement of these wheels 28 and 29 with the hubs 22 and 23, so that the ratio of rotation of the upper hub with respect to the lower hub steadily decreases as more tape is wound thereon and removed from the lower hub. This change in drive ratio continues until all of the tape is wound upon the upper hub 22. It is desirable in this respect to form the friction wheels 28 and 29 from a material which will transmit rotational drive to the hubs through the frictional engagement therewith, and will yet permit of a slippage in the engagement, so as to accommodate the change in drive ratio required. It has been found that rubber wheels or rubber-coated wheels are suitable in this respect, and also certain types of fiber wheels may be utilized to provide the desired coefficient of friction between the wheels and hubs. In the direction of rotation described above for unreeling of tape from the lower hub and reeling same upon the upper hub, the second drive means 27 is inoperative to transmit driving force between the hubs. As the upper hub is rotated, the wheel 41 engaging same will also be rotated by the frictional engagement therebetween. However, the ratchet 46 operates to disconnect the two wheels 41 and 42 for a relatively counterclockwise rotation of wheel 41 with respect to wheel 42, as viewed from the top thereof. While the ratchet means 33 of drive means 26 serves to lock together the two frictional wheels 28 and 29 for clockwise rotation thereof, as viewed from the top of same, the ratchet 46 of drive means 27 serves to disconnect the friction wheels 41 and 42 for this direction of rotation. At such time as the magnetic tape 13 is entirely or substantially entirely unwound from the lower hub 23 of the reel, and is then fully wound upon the upper hub 22 thereof, a reverse operation is possible in accordance herewith. There have been developed magnetic tapes which may be employed either for reproduction or playback in either or both directions of passage thereof across appropriate heads, and thus the cartridge of the present invention is adapted for the unwinding of tape from either hub of the reel, and the simultaneous winding of same upon the opposite hub. This is herein accomplished through suitable drive means such as a second capstan and pinch wheel, located upon the opposite side of the playback or reproduction head 16 of Fig. 1, wherein tape is withdrawn from the upper hub 22 which thereupon serves as a supply hub of the reel. The withdrawing of tape from the upper hub 22 will be seen to rotate this hub in a clockwise direction. The upper friction wheel 41 of drive means 27 will thus be rotated in a clockwise direction as viewed from above, and in this direction of rotation the wheel 41 is ratcheted by means 46 to the lower friction wheel 42, so that same is rotated in the same direction. The lower hub 23 will be seen to be driven by frictional engagement with the wheel 42 in a counterclockwise direction, so as to thereby take up magnetic tape 13 being wound thereon. The difference in radius at the points on the upper and lower hubs engaged by the two friction wheels 41 and 42, provides an initial differential drive ratio required to maintain appropriate tension on the tape when same is unwound from a relatively large diameter onto a substantially lesser diameter.

It will be appreciated from the above description of a preferred embodiment of the present invention that there is provided herewith a double-hub reel particularly adapted to the simultaneous winding and unwinding of magnetic tape, whereby operations may be performed thereon or results attained therefrom, in accordance with the placement and energization of playback recording or erasing heads. A magnetic tape cartridge, including the double-hub reel of the present invention, will be seen to be quite compact, while yet affording all of the advantages of two separate reels without requiring the space occupied by conventional reels. By the provision of differential drive means and reverse differential drive means, in accordance herewith, it is possible to provide for maintaining a constant tension upon magnetic tape, or the like, which is supplied from one hub of the reel and taken up upon the other hub thereof, so that a smooth and continuous movement of the tape across appropriate heads is possible without binding or other difficulties often encountered with conventional magnetic tape reels. The drive means 26 and 27 described above provide, in either direction of magnetic tape motion, a friction drive of the take-up hub of the reel from the supply hub thereof, whereby a constant tape speed is attained through the provision of a different rotational speed of the two hubs. An initial differential ratio is provided for rotating the take-up portion of the reel at a much greater angular velocity than the supply hub, and the frictional engagement between the drive means and the two hub portions of the reel accommodate the necessary reduction in this ratio, to a point wherein the ratio is, in fact, reversed, where substantially all of the tape is removed from the supply reel and wound upon the take-up hub. Of particular importance as regards the present invention is the simplicity and consequent low cost thereof, for it is well recognized that magnetic tape cartridges and the like must be quite inexpensive of manufacture in order to be economically feasible. Complicated differential gearing and clutch mechanisms which may be possible to design for affording the necessary drive ratio of a variable nature, such as herein provided, are wholly unsuited to the application envisioned for the present invention. Not only it is necessary for the magnetic tape reel to occupy a minimum of physical space, but also, it is necessary for the mechanism to be sufficiently simple of construction and inexpensive as to suit same for this application.

The physical placement of elements and apparatus exteriorly of the magnetic tape cartridge 11, illustrated in Fig. 1 of the drawings, is a matter of individual choice and design, and is not necessarily influenced by the magnetic tape cartridge of the present invention. Quite conventional recording and playback mechanisms are suited for accommodating the magnetic tape cartridge of the present invention, and in particular, those devices adapted to operate with endless loop cartridges are directly usable with the magnetic tape cartridge of the present invention without modification, and with a material improvement in the results attainable as a result of the overcoming by the present invention of the difficulties of endless loop cartridges.

What is claimed is:

1. An improved cartridge for magnetic tape comprising a pair of independently rotatable hubs mounted upon the same axis and having facing peripheral rims, a pair of friction wheels disposed between said hubs and mounted upon a common axis inclined with respect to the axis of said hubs, said wheels being disposed to engage one of same with the interior surface of one hub and the other engaging the interior surface of the other hub, and said points of engagement being at different lengths of hub radii, whereby rotation of one hub frictionally drives the other hub to rotate at a differential ratio.

2. An improved cartridge for magnetic tape as defined in claim 1, further characterized by a second pair of friction wheels disposed on the opposite side of the hub axis from the first pair and rotatable about an axis parallel to the axis of said first pair of friction wheels, and ratchet means interconnecting the wheels of each pair thereof, said ratchet means being oppositely oriented as regards rotational direction of drive engagement whereby forced rotation of either of said hubs frictionally drives the other hub in differential drive ratio.

3. An improved magnetic tape cartridge comprising a central plate having a pair of hubs rotatably mounted in axial alinement on opposite sides thereof, a pair of wheels rotatably mounted on said plate upon an axis that is inclined with respect to the hub axis to frictionally engage one wheel with one hub and the other wheel with the other hub whereby said wheels engage said hubs at different lengths of hub radii and rotation of one hub frictionally drives the other hub in the opposite direction at a differential ratio proportional to the different lengths of hub radii at points of wheel engagement as modified by slippage of the frictional engagement.

4. An improved magnetic tape cartridge as claimed in claim 3, further defined by ratchet means connecting said wheels and locking same together for one direction of rotation only.

5. An improved magnetic tape cartridge as claimed in claim 3, further characterized by a second pair of wheels mounted for rotation on said plate and disposed in diametrically opposite sides of said hub from the first pair of wheels, said second pair of wheels being disposed in parallelism with the first pair and individually engaging separate hubs, and ratchet means connecting the wheels of each pair thereof, with said ratchet means being oppositely arranged whereby forced rotation of either hub differentially drives the other hub through a single pair of wheels.

6. A double-hub reel for magnetic tape comprising first and second hubs mounted in axial alinement for independent rotation and each having a rim thereabout to accommodate the winding of magnetic tape thereupon, first and second wheels mounted for rotation and frictionally engaging said first hub at different lengths of radii of the latter, third and fourth wheels mounted for rotation and frictionally engaging said second hub at different lengths of radii thereof, first ratchet means connecting said first and third wheels for locking same together for one direction of relative rotation thereof, and second ratchet means connecting said second and fourth wheels for locking same together for an opposite relative direction of rotation thereof whereby forced rotation of either hub differentially rotates the other hub.

7. A double-hub reel for magnetic tape comprising a pair of like hubs rotatably mounted upon a single axle and having facing peripheral rims for the winding of magnetic tape thereon, a first pair of parallel wheels disposed between said hubs and mounted for rotation about a first axis inclined with respect to said hub axle to dispose one of said wheels in frictional engagement with one of said hubs and the other wheel in frictional engagement with the other hub at a different hub length of radius, a second pair of wheels disposed on the opposite side of the hub axle from said first pair of wheels and mounted for rotation about a second axis parallel to said first axis, one of the wheels of said second pair thereof frictionally engaging one of said hubs and the other frictionally engaging the other hub at the same difference in length of hub radius as said first pair of wheels, and first and second ratchet means connecting the wheels of said first and second pairs of wheels, respectively, said ratchet means being oppositely oriented whereby rotation of either hub frictionally rotates the other hub in the opposite direction at a differential ratio of rotational velocity so that magnetic tape unwound from either hub and extending into connection with the other is smoothly wound thereon.

No references cited.